United States Patent [19]

Hall et al.

[11] 3,913,498

[45] Oct. 21, 1975

[54] CANTILEVER RACK

[75] Inventors: Lee Z. Hall, Huntington Woods; Richard B. Rowader, Detroit, both of Mich.

[73] Assignee: Palmer-Shile Company, Detroit, Mich.

[22] Filed: Oct. 9, 1973

[21] Appl. No.: 404,484

[52] U.S. Cl. ................ 108/111; 211/177; 211/148
[51] Int. Cl.² .......................................... A47B 57/20
[58] Field of Search ........... 108/111, 114, 108/108, 108/109; 211/177, 176, 148

[56] References Cited
UNITED STATES PATENTS

| | | | |
|---|---|---|---|
| 2,937,767 | 5/1960 | Butler | 211/148 |
| 3,127,995 | 4/1964 | Mosinski | 211/148 |
| 3,212,648 | 10/1965 | Baker et al. | 211/177 |
| 3,263,821 | 8/1966 | Klene | 108/108 X |
| 3,358,847 | 12/1967 | Magnuson | 211/177 |
| 3,550,785 | 12/1970 | Seiz | 211/177 |
| 3,655,159 | 4/1972 | Held | 211/148 |
| 3,741,405 | 6/1973 | McConnell et al. | 211/177 |
| 3,767,059 | 10/1973 | Seiz | 211/176 |
| 3,827,377 | 8/1974 | Aughtry | 211/177 |

*Primary Examiner*—Francis K. Zugel
*Attorney, Agent, or Firm*—Harness, Dickey & Pierce

[57] ABSTRACT

A cantilever rack for use where capacity requirements are limited. Bases support spaced columns with each column having an open unwelded box section. The cantilever arms are supported on the posts by U-shaped brackets embracing the columns in a direction at right angles to the extent of the arms. Pins extend through slots in the connectors and apertures in the columns so that the weight on the arms wedges the connectors against the columns. The pins are concealed within the arm structure. The arms may extend in one or both directions from the connectors.

5 Claims, 10 Drawing Figures

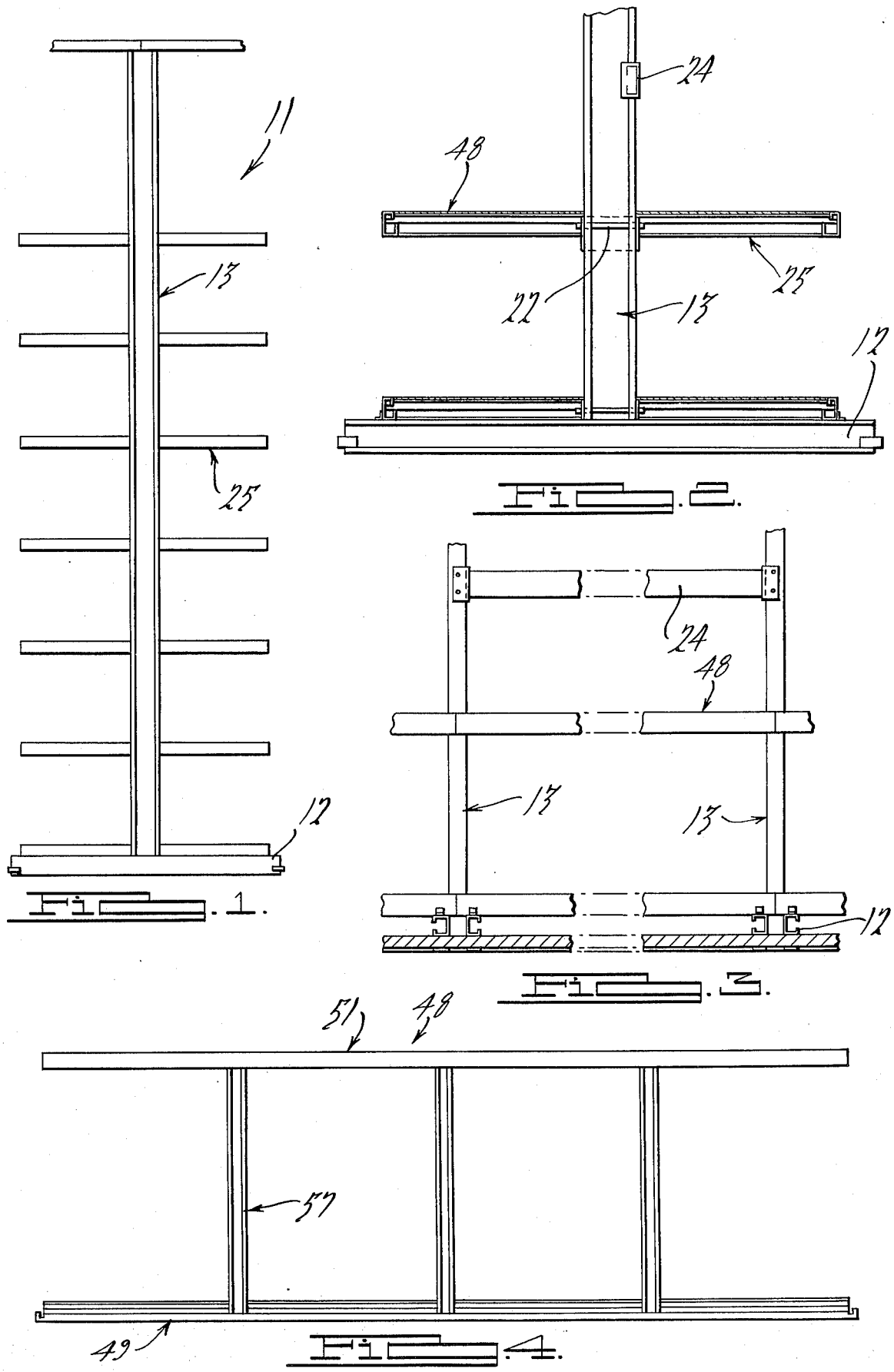

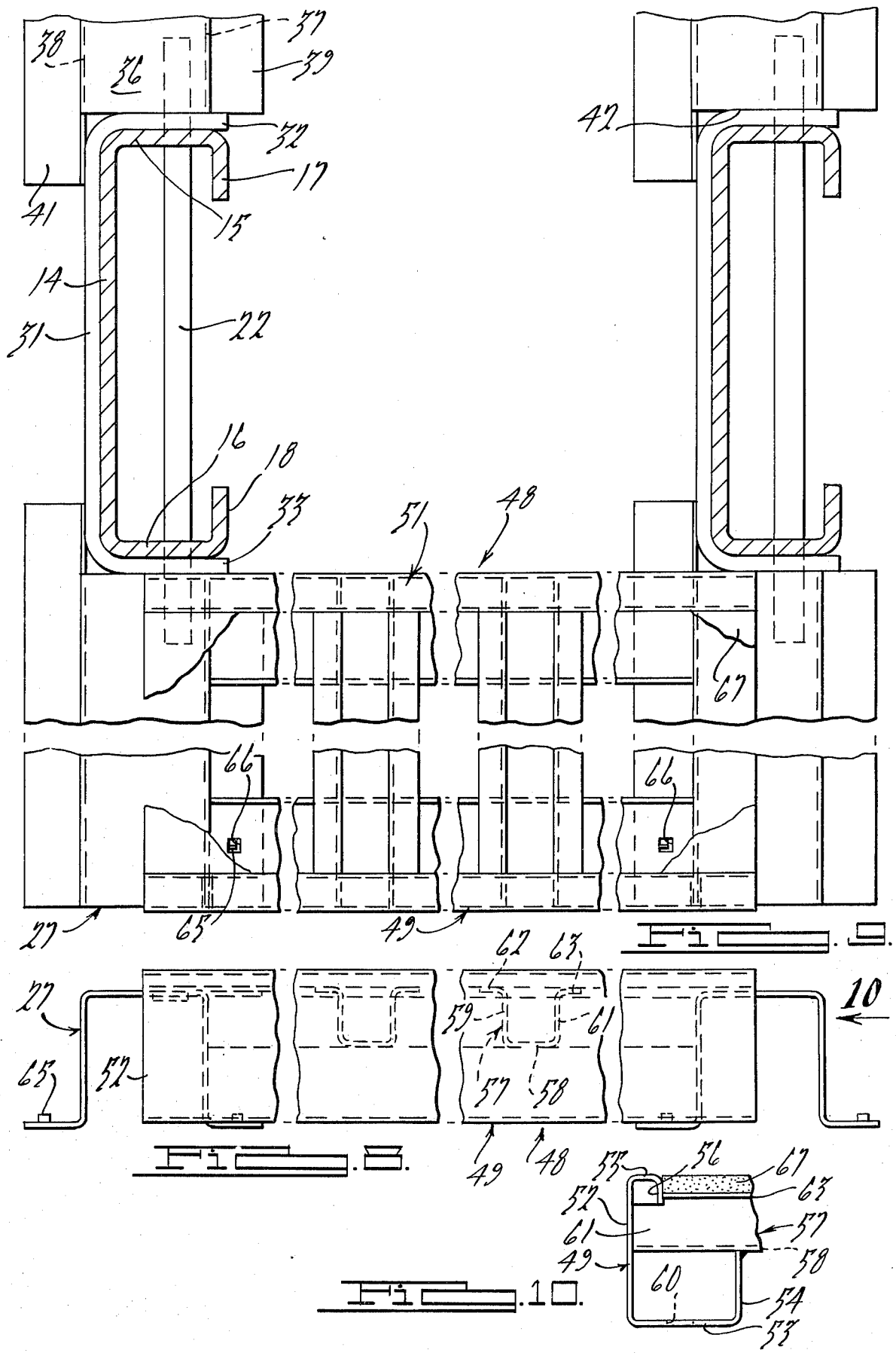

CANTILEVER RACK

BACKGROUND OF THE INVENTION

1. Field of the Invention

The invention relates to cantilever storage racks and more particularly to racks of the type having spaced columns with cantilever arms secured thereto and supporting decks. The invention has particular applicability to racks where the load capacity requirements are limited, such as in furniture warehouses.

2. Description of the Prior Art

Baker et al U.S. Pat. No. 3,212,648 shows a cantilever rack in which a U-shaped connector at the inner end of each arm has a pin-and-slot wedge connection with the column. The latter is composed of two open box sections welded together to form a closed box section, the connectors embracing the columns in the direction of the arms.

While this patented rack is advantageous for high load requirements, it is a relatively expensive construction requiring welding of columns. The pin ends are exposed and only a single arm is supported by each connector.

Sturdi-Bilt Material Handling Division of Unarco Industries, Inc., Chicago, Ill. provides a cantilever rack to which U.S. Pat. Nos. 3,760,650 and 2,815,130 pertain. This rack has connectors carrying double cantilever arms and connected to the columns by separate hook members. This prior construction has a number of disadvantages compared with the present invention, including a considerably more expensive column construction, the necessity of providing slots in the columns at points of weakness, and a more complicated, expensive, and inefficient wedging construction.

BRIEF SUMMARY OF THE INVENTION

It is an object of the present invention to provide a novel and improved cantilever rack which is especially adapted for limited capacity uses and is considerably less expensive to construct and assemble than previous constructions.

It is a further object to provide an improved cantilever rack of this nature which can include double cantilever arms, that is arms extending in opposite directions from a single connector, without the necessity of building two separate arms and connectors.

It is a further object to provide an improved cantilever rack having these characteristics in which the connecting means is concealed by the arms and the latter are adapted for supporting and retaining decks which extend between adjacent arms.

It is another object to provide an improved cantilever rack of this character in which the connector wedging means is simple and efficient, requiring a minimum of parts.

Briefly, the illustrated embodiment of the invention comprises a base, a column secured to and extending upwardly from said base, said column having an open box-shaped cross section with the opening facing one side, a U-shaped connector embracing said column, at least one cantilever arm member secured to said connector and extending outwardly therefrom at right angles to the direction in which the connector embraces the column, a series of vertically spaced pairs of apertures in said columns with each pair aligned in the direction of extent of said cantilever arm member, a pair of apertures in the corresponding sides of said connector, and a pin extending through said column and connector apertures, edges of said connector apertures engaging said pin to force the connector into wedging engagement with the column.

BRIEF DESCRIPTION OF THE DRAWINGS

FIG. 1 is a side elevational view of a cantilever rack incorporating the principles of the invention;

FIG. 2 is an enlarged fragmentary elevational view of the lower portion of the column and its base;

FIG. 3 is a side elevational view of a portion of a rack showing a brace extending between columns and also showing a deck extending between arms;

FIG. 4 is a top plan view of a deck;

FIG. 8 is a side elevational view, parts being broken away, of a deck;

FIG. 9 is a broken cross-sectional plan view showing how a deck extends between cantilever arms, the deck board being removed; and FIG. 10 is a fragmentary side elevational view of a deck taken in the direction of the arrow 10 of FIG. 8.

DESCRIPTION OF THE PREFERRED EMBODIMENT

The rack is generally indicated at 11 in FIG. 1 and comprises a plurality of elongated horizontal bases 12 to each of which is attached a column generally indicated at 13. Base 12 is shown as having a pair of open box-shaped members back to back with column 13 disposed therebetween.

Figure 5:
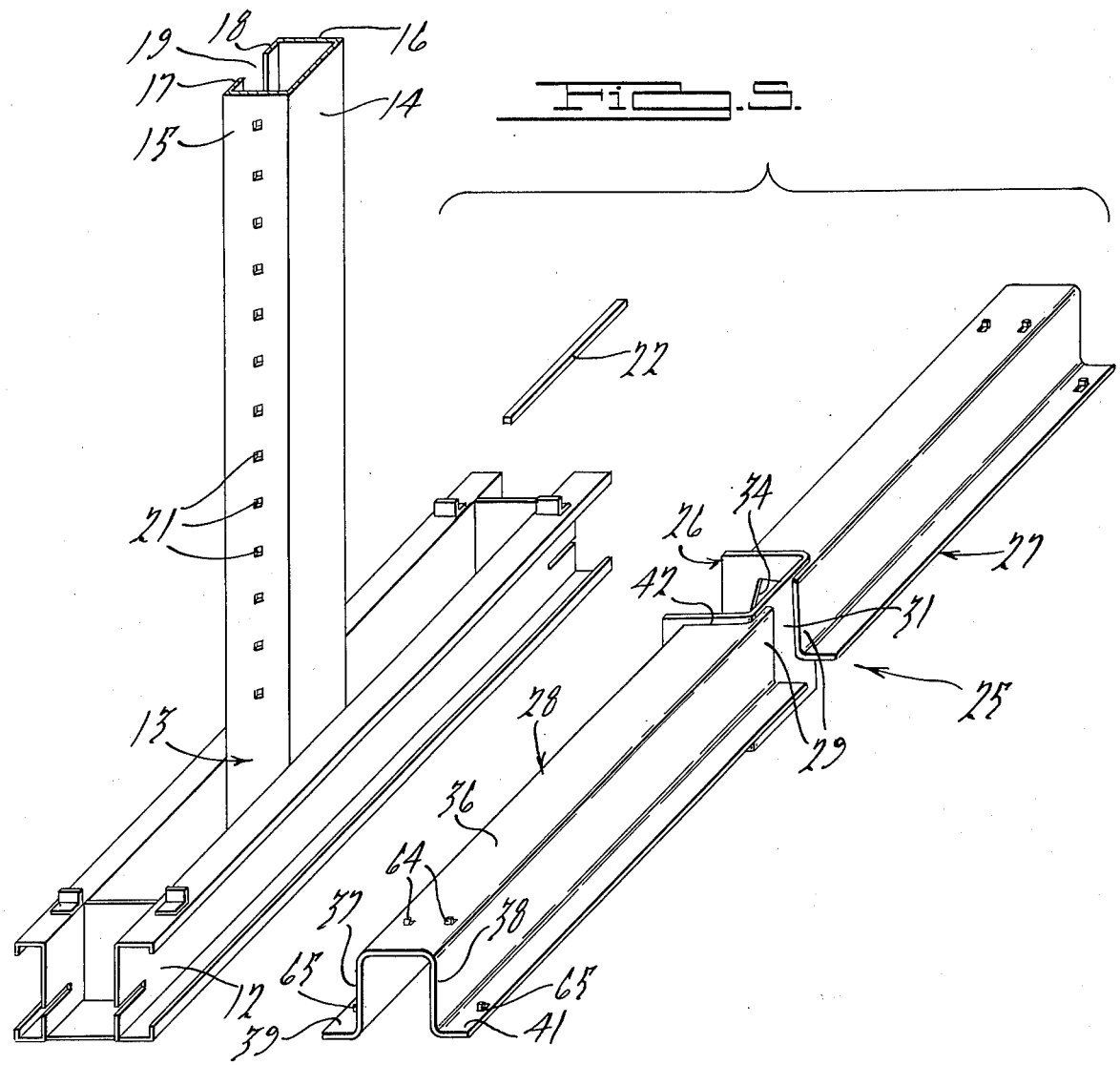
FIG. 5 is an exploded perspective view showing component parts of the cantilever rack.

The construction of column 13 is perhaps best seen in FIG. 5. The column is of open box-shaped cross section, having a central web 14, a pair of flanges 15 and 16 extending in parallel relation from opposite edges of the web, and a pair of inwardly directed end flanges 17 and 18 parallel to web 14 but having ends spaced a substantial distance from each other. The column may be fabricated from a single piece of metal without the necessity of welding parts together. In a rack 11, all openings 19 in each column between flanges 17 and 18 may face in the same direction.

Figure 6:
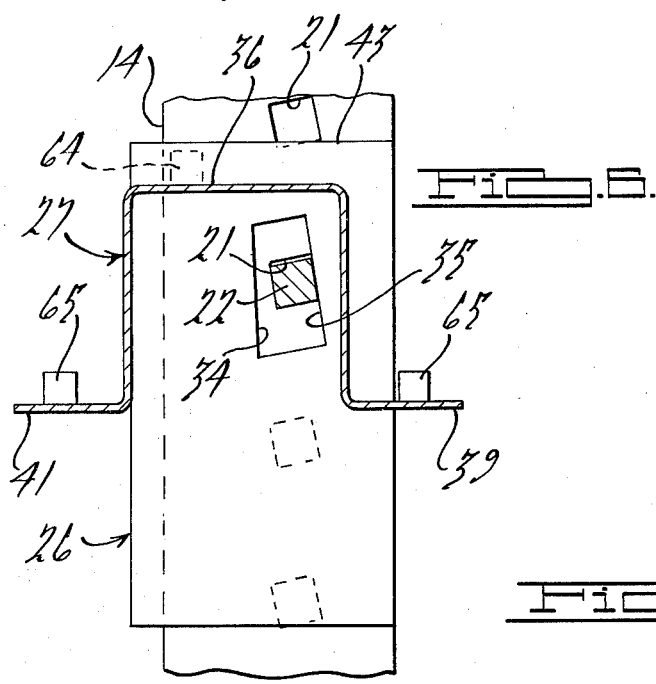
FIG. 6 is a cross-sectional view in elevation showing the manner in which a connector is secured to a column and the connecting pin is concealed within the arm.
Figure 7:
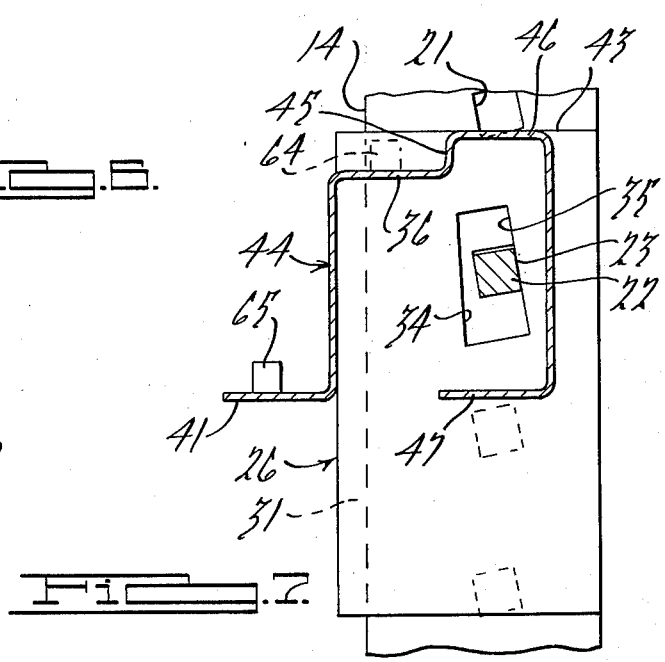
FIG. 7 is a view similar to FIG. 6 but showing an arm mounted on an end column.

Each column 13 is provided with a plurality of vertically spaced pairs of apertures 21. Each aperture is of rectangular shape with the apertures of each pair being aligned in a horizontal direction. As seen in FIGS. 6 and 7, the apertures are inclined so that the rectangular pins 22 which pass through the apertures when the rack is assembled will have side surfaces 23 inclined downwardly and away from webs 14 in order to achieve the connector wedging action described below.

Adjacent columns 13 are connected by one or more braces 24 (FIG. 3); where necessary, diagonal braces (not shown) may be utilized.

Each arm is generally indicated at 25 (FIG. 5) and comprises a U-shaped connector generally indicated at 26 and a pair of arm members generally indicated at 27 and 28 connected at 29 to the connector and extending in opposite directions therefrom. It should be understood that arm 25 may comprise only a single arm member extending in one direction from connector 26 instead of the two arm members shown.

Each connector 26 comprises a web 31 and a pair of flanges 32 and 33 (FIG. 9). A pair of aligned apertured portions 34 are formed in flanges 32 and 33 (FIGS. 6 and 7). The edges 35 of apertures 34 remote from webs 31 are inclined downwardly and away from the web at the same angle that apertures 21 are inclined, so that when edges 35 rest on pin surfaces 23, the latter will wedge web 31 against the column web 14.

The shape of connectors 26 is such that webs 31 will firmly and frictionally engage webs 14 of the columns and flanges 32 and 33 will embrace flanges 15 and 16 respectively. Apertures 34 are of sufficient size to permit a pin 22 to be passed through these apertures as well as apertures 21 when connectors 26 are slightly elevated from the positions shown in FIGS. 6 and 7, after which the connectors may be permitted to drop so as to achieve the above described wedging engagement.

Arm members 27 and 28 extend at right angles to the direction in which connectors 26 embrace and are wedged against columns 14. Two types of arm members are shown in the figures, one type (FIGS. 5 and 6) used on intermediate columns and another type (FIG. 7) used on an end column of a rack. A mirror image of the arm member shown in FIG. 7 would be used on the other end column of the rack.

Each arm member 27 and 28 has an upper horizontal web portion 36, a pair of downwardly extending flanges 37 and 38, and a pair of flanges 39 and 41 extending outwardly from the lower ends of flanges 37 and 38 respectively. The depth of each arm member is substantially less than the depth of connector 26, and the inner end 42 of each arm member is notched as shown in FIGS. 5 and 9 so as to interfit with the connector. More particularly, the inner ends of web 36 and flanges 37 and 39 are removed so that flange 38 partially overlaps connector web 31 at 29 (FIG. 5), the arm being welded to the connector. Web 36 is above aperture 34 so that pin 22 will be concealed within the column 13 and arm members 27 and 28 after assembly. However, web 36 is slightly below the top edge 43 of connector 26 to allow room for a deck board described below.

An end arm for one end of the rack is generally indicated at 44 in FIG. 7. This arm is basically similar to arms 27 and 28 with the exception that a midportion of web 36 has an upper extension 45 with the remainder 46 of the web flush with the top edge 43 of connector 26. Furthermore, one lower horizontal flange 47 of arm 44 is turned inwardly instead of outwardly. The end arm (not shown) for the other end of the rack will be the mirror image of arm 44.

Decks generally indicated at 48 in FIGS. 8 and 9 rest on and extend between adjacent arms of the cantilever rack. Each deck comprises forward and rear horizontal members generally indicated at 49 and 51 respectively. The construction of member 49 is typical as seen in FIG. 10, the member having a vertical web 52, a lower inturned horizontal flange 53, a flange 54 extending upwardly from the inner end of flange 53, an upper inwardly extending horizontal flange 55 shorter than flange 53, and a short flange 56 extending downwardly from the inner end of flange 55. Cross members generally indicated at 57 extend between members 49 and 51 and are welded thereto, these members (FIG. 8) having lower horizontal webs 58, upwardly extending flanges 59 and 61, and horizontal flanges 62 and 63 extending outwardly from the upper ends of flanges 59 and 61 respectively. Flanges 62 and 63 are slightly lower than flanges 55 of members 49 and 51.

As seen in FIG. 4, members 57 are spaced inwardly from the ends of members 49 and 51, the latter being notched to rest on arms 27, 28 and 44. To retain the decks on the arms, the arms are provided with tabs 64 on their webs 36 and tabs 65 on flanges 39 and 41. Apertures 66 (FIG. 9) are provided in flanges 53 of members 49 in order to accommodate tabs 65. The tabs are engageable with portions of members 49 and 51 to prevent lateral shifting of deck 48, that is, shifting in the direction of extent of members 49 and 51, and also to prevent outward shifting of the deck with respect to the arms. As seen in FIGS. 8 and 9, webs 52 of deck members 49 will engage the outer ends of the arms to prevent them from shifting inwardly.

The level of flanges 55 is slightly higher than that of arm webs 36 to retain a particle or other deck boards 67 (FIG. 10). These deck boards will rest on flanges 62 and 63 of cross members 57. The lengths of decks 48 are such that they will reach the midpoints of arm member webs 36 so that adjacent decks will be flush and continuous at each level. At each end of the rack, the deck board 67 will abut flange portion 45 of web 36 (FIG. 7).

In use, racks 11 will be assembled by placing columns 13 and their bases 12 in properly spaced relation and connecting them by members 24. Arms 25 will be mounted on the columns by slipping connectors 26 over the columns and inserting pins 22. Decks 48 will then be assembled on the arms and deck boards 67 placed on the decks. The result will be a sturdy, clean and economical rack especially adapted for use in furniture warehouses or other areas where required load capacities are limited.

What is claimed is:

1. In a cantilever rack construction, a base, a column secured to said base and extending upwardly therefrom, said column having an open rectangular box cross section with a central web, a pair of parallel side flanges and a pair of spaced end flanges extending toward each other from the outer ends of said side flanges, said end flanges being entirely within the lateral confines of said side flanges, vertically spaced pairs of rectangular apertures in said side flanges, said apertures being inclined downwardly and away from said web, an arm comprising a U-shaped connector having a web adapted to engage the column web and a pair of flanges extending in parallel relation from the outer edges of said web and adapted to embrace the side flanges of said column, a pair of aligned apertures in said connector side flanges, the edges of said connector apertures remote from the connector web being inclined at the same angle as said column apertures, two arm members secured to said connector, each arm member comprising an upper web, a pair of side flanges extending downwardly in parallel relation from the opposite edges of said web, the inner end of each arm member being secured to said connector so that said arm member webs are above said connector apertures and said arm member side flanges are on opposite sides of said connector apertures, and a rectangular pin extending through said connector apertures and a pair of column apertures whereby said pin is concealed by said column and arm members and a downward weight on said arm members will bring said connector web into wedging engagement with said column web in a direction at right angles to the extent of said arm members.

2. The combination according to claim 1, there being a second base, column and arm similar to said first-mentioned base, column and arm and in spaced relation therewith, a brace connecting said columns, a connector and pin for said second arm similar to those for said first arm, lower flanges on the arm members of said two arms extending toward each other, and a deck extending between said arm members, portions of said deck resting on said lower flanges and other poritons resting on said arm member webs.

3. The combination according to claim 2, further provided with interfitting means on said arms and deck for preventing shifting movement of the deck with respect to the arms.

4. The combination according to claim 1, said decks comprising front and rear members extending between said arm members and cross members extending between said front and rear members, raised lips on said front and rear members, and a deck board between said lips and resting on said cross members and the webs of said arm members.

5. In a cantilever rack, a plurality of horizontally spaced bases, a column secured to an intermediate portion of each base and extending upwardly therefrom, bracing means connecting said columns, the section of each column being of open rectangular shape and having a central web, a pair of side flanges and a pair of inwardly extending end flanges spaced from each other, said end flanges being entirely within the lateral confines of said side flanges, a plurality vertically spaced pairs of rectangular apertures in each column, the apertures being inclined downwardly and away from the web, a plurality of pairs of cantilever arms for said column, each cantilever arm comprising a U-shaped connector having a web and a pair of side flanges adapted to embrace the web and side flanges of its column, a pair of aligned apertures in the connector side flanges having edges remote from the connector web extending downwardly and away from the connector web, a pin extending through the connector and a pair of column apertures whereby weight on the connector will cause the pin to wedge the connector web against the column, a pair of arm members secured to and extending from the opposite side flanges of each connector in a direction at right angles to the direction of said wedging engagement, each arm member having an upper web and a pair of side flanges surrounding said connector apertures, whereby said pin will be concealed, the arm members on intermediate columns of said rack having a pair of outwardly extending lower flanges and the arms on the end columns of the rack having one lower flange extending toward the remainder of the rack and an inwardly extending lower flange on the outside of the rack, decks extending between adjacent arm members, each deck comprising front and rear members resting on the arms and a plurality of intermediate cross members connecting the front and rear members, the upper surfaces of said cross members being flush with said arm member webs, interfitting means on the arms and decks retaining the decks against lateral, inward or outward movement with respect to the arm members, and deck boards resting on said deck cross members and said arm webs.

* * * * *

UNITED STATES PATENT OFFICE
CERTIFICATE OF CORRECTION

PATENT NO. : 3,913,498
DATED : October 21, 1975
INVENTOR(S) : Lee Z. Hall et al

It is certified that error appears in the above-identified patent and that said Letters Patent are hereby corrected as shown below:

Claim 3, column 5, line 13, "claim 2" should read --claim 1--.

Signed and Sealed this second Day of March 1976

[SEAL]

Attest:

RUTH C. MASON
*Attesting Officer*

C. MARSHALL DANN
*Commissioner of Patents and Trademarks*